Nov. 24, 1959     R. B. MATTHEWS     2,914,688
HOMOPOLAR MOTOR
Filed Jan. 4, 1954
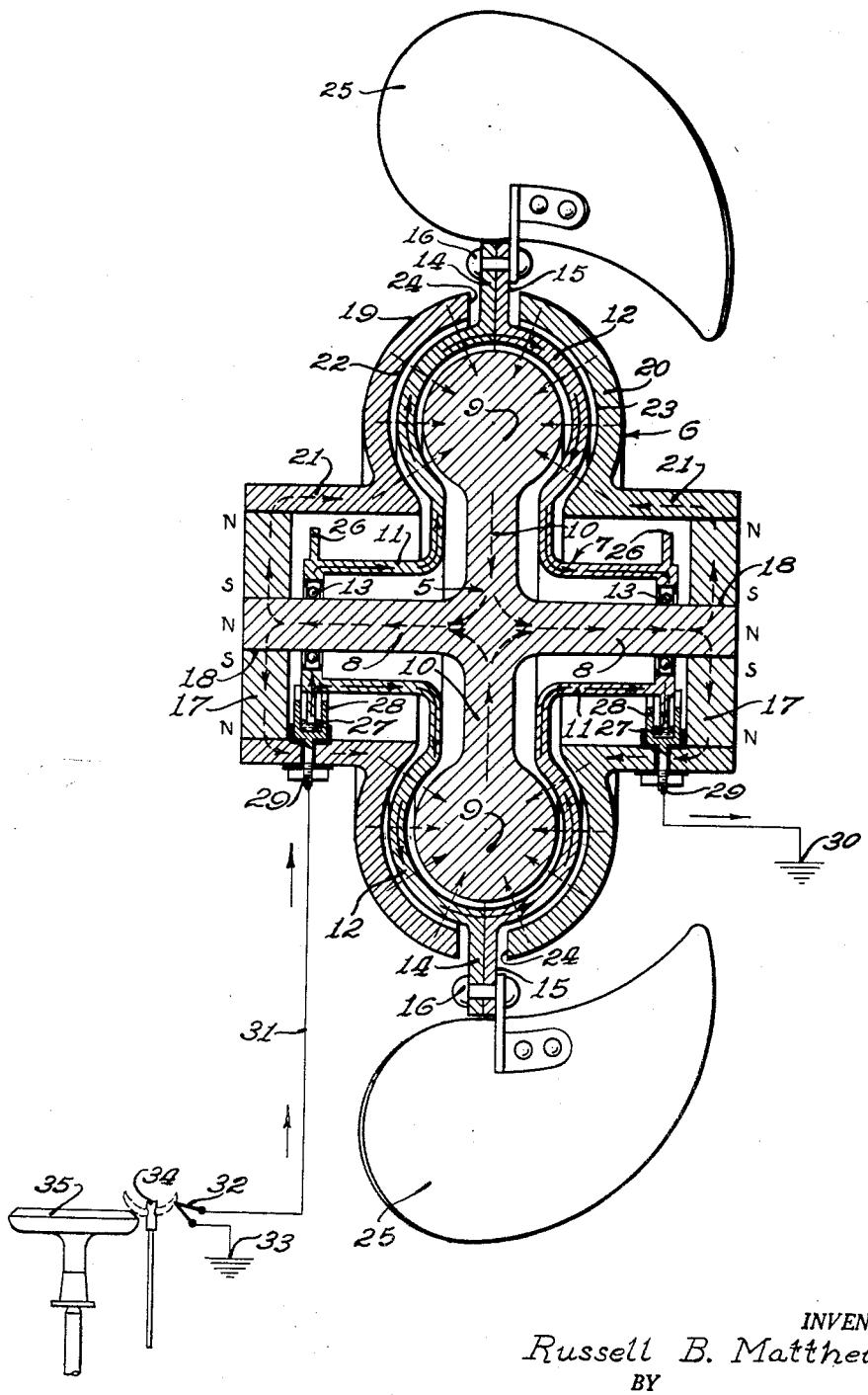
INVENTOR.
Russell B. Matthews
BY
Seegert & Schwalbach
Att'ys

United States Patent Office 2,914,688
Patented Nov. 24, 1959

2,914,688
HOMOPOLAR MOTOR

Russell B. Matthews, Wauwatosa, Wis., assignor to Baso Inc., Milwaukee, Wis., a corporation of Wisconsin Application January 4, 1954, Serial No. 401,817

10 Claims. (Cl. 310—178)

This invention relates to improvements in electric motors, and more particularly to motors which are operable on relatively small amounts of power, for example the power available from a thermoelectric generator.

There are many installations in which it is desirable to perform certain mechanical operations without utilizing line power. Illustrative of such a case is the use of fresh air circulating means in a fluid fuel burning heater for increasing the heat transfer rate and thereby the efficiency of the apparatus in heating a given space. While thermoelectric power can be made readily available in such apparatus, no satisfactory motor has been developed which is operable on the limited power available from a thermoelectric generator and which is capable of performing a usable amount of work, for example powering air circulating means.

It is therefore a principal object of the present invention to provide a motor of novel, and more particularly, unipolar construction, said motor being operable on thermoelectric power.

Another object of the invention is to provide an improved electric motor characterized by high efficiency and very low resistance.

Another object of the invention is to provide an improved electric motor of the aforementioned character which lends itself to economical manufacture, said motor being fabricated largely from metal stampings and being entirely devoid of windings.

A more specific object of the invention is to provide an electric motor of the character described having a magnetically permeable core and a magnetically permeable casing having portions in flux conducting connection and having other portions spaced to provide an annular air gap, there being permanent magnet means for causing magnetic flux flow in said core, casing and said air gap, there also being a rotor of non-magnetic and electrically conductive material having portions movable in said air gap, and means including a source of thermoelectric current for causing flow of said current through said rotor portions, to thereby cause turning movement of the rotor.

Another object of the invention is to provide an improved electric motor of novel toroidal construction which produces maximum rotor torque for a given flux flow across the air gap and current flow through the rotor, said construction at the same time affording improved compactness.

Other objects and advantages of the invention will become apparent as the description proceeds, reference being had to the accompanying drawing illustrating one form of the invention and wherein:

The sole figure is a vertical sectional view of an electrical motor constructed in accordance with the invention and having electrical connections with a thermoelectric generator associated therewith and illustrated diagrammatically.

Referring more particularly to the drawing, the improved electric motor is known generally as being of the unipolar type and comprises a core 5, a frame or casing 6 and a rotor 7. The core 5 is made of magnetically permeable material and has a shaft-like portion 8. Intermediate the ends of the shaft-like portion 8, the core 5 is formed with a coaxial toroidal portion 9 of relatively large diameter connected thereto by a web portion 10. The toroidal portion 9 may be generally circular in cross section, as shown.

The rotor 7 is made of non-magnetic and electrically conductive material, for example copper, and may comprise tubular cylindrical end portions 11 coaxially surrounding the core portion 8 in spaced relation, said rotor also being formed with an intermediate toroidal shell-like portion 12 which is spaced from and conforms to the contours of the portions 9 and 10 of the core 5. The outer ends of the rotor portions 11 are insulatably mounted on suitable bearings 13, by which said rotor is journaled on the core portion 8. The rotor 7 may be formed in two sections as shown, said sections being provided with complementary peripheral flanges 14 and 15 suitably secured together as by rivets 16.

A pair of preferably identical circular permanent magnets 17 are centrally bored, as at 18, to receive the outer ends of the core portions 8 in flux conducting relation. The polarity of each of the magnets 17 is such that one pole thereof is located at the margin of the aperture 18, and the other pole thereof is located at the periphery.

The casing or frame 6 is formed of a pair of substantially identical sections 19 and 20 which may take the form of metal stampings, each of said sections having a tubular cylindrical portion 21, the outer end of which has a coaxial snug fit on the periphery of one of the permanent magnets 17 to provide a flux conducting connection. The casing sections 19 and 20 are also provided with inner surface portions 22 and 23 which are spaced from and conform to the contours of the toroidal portion 12 of the rotor 7, as shown, to provide an effective air gap of generally toroidal shape between said surface portions and said toroidal core portion. It is apparent that the spacing between the casing sections 19 and 20 provides a peripheral slot 24 in said casing through which the rotor flanges 14 and 15 project for connection with one or more driven members, for example impeller blades 25 fixed thereto by the rivets 16.

Low-resistance and low-friction electrical connections to the rotor 7 are afforded in the illustrated embodiment by radially outwardly directed flanges 26 formed in the outer ends of the tubular rotor portions 11, said flanges extending into electrical contact with pools 27 of an electrically conductive liquid, for example mercury, contained in metal receptacles 28. The receptacles 28 are insulatably mounted within the casing 6 and have terminal connectors 29 insulatably extending through said casing. One of the connectors 29 may be grounded, as at 30, and a conductor 31 may connect the other connector 29 in circuit with one terminal of a source of thermoelectric current, for example a thermocouple, said thermocouple having its other terminal grounded as at 33. The thermocouple 32 may be suitably heated, for example by subjecting it to the heat of the flame of a pilot burner 34, which burner may also coact with a main fuel burner 35.

In the operation of the improved motor, magnetic flux is generated by the permanent magnets 17 and flows therefrom, for example, as indicated by the broken arrows, i.e. through the casing sections 19 and 20, across the air gap separating said sections from the portion 9 of the core 5, and through said core back to the magnets 17. As indicated by the solid arrows, thermoelectric current from the thermocouple 32 enters one end of the rotor 7 and flows through said rotor, including the portion 12 thereof located in the air gap, said current leaving the rotor through the opposite end thereof and returning to the thermocouple 32 through the ground circuit between grounds 30 and 33.

The flow of thermoelectric current through the portion 12 of the rotor 7 establishes a field which reacts with the flux flowing across the air gap to provide a motor action which urges the rotor 7 in a clockwise direction as viewed from the right in the drawing. Turning movement of the rotor 7, of course, causes actuation of the driven member or members, which in the illustrated embodiment are the impeller blades 25, and which, when actuated, provide gentle air circulation, for example in the jacket of a space heater in which said motor may be mounted.

The operation of the improved motor may be more easily understood if it will be assumed that the rotor 7 is comprised of an infinite number of conductors extending from one end of the rotor to the other. Thermoelectric current flow in each of the hypothetical conductors creates a circumferential field thereabout. The flux flow in the air gap, being normal to said conductor, opposes and neutralizes the circumferential field on one side of the conductor and reinforces said field on the opposite side of the conductor. The resulting unbalance urges the conductor in a direction toward the side of the conductor at which the field thereof is neutralized.

By virtue of the fact that the toroidal air gap is spaced a substantial distance from the axis of the rotor, maximum torque is exerted on the rotor for a given amount of flux flow across the air gap and current flow through the rotor. This provides maximum efficiency, and the novel toroidal conformation of the air gap and rotor affords relatively high power output for a given size motor.

The improved motor structure is characterized by very low resistance, being entirely devoid of energizing windings and a commutator, and having a one piece rotor of inherently low resistance. The low resistance of the improved motor can be matched to the internal resistance of the particular thermoelectric generator 32 utilized, so that maximum use is made of the power available from said generator in operation of the motor.

It is within the concept of the invention to provide that the core 5 be a permanent magnet for producing the flux flow indicated in the drawing. In such an event the circular end members 17 need be only of magnetically permeable material rather than permanent magnet material. If desired, however, both the core 5 and the members 17 may form a single permanent magnet.

While the drawing illustrates the improved motor being used as part of an air circulating means, its use is by no means limited to the illustrated application, since it can be utilized equally well as a source of rotative power in other applications.

The specific illustration and corresponding description are used for the purpose of disclosure only and are not intended to impose unnecessary limitations on the claims, or to confine the patented invention to a particular use. Various changes and modifications may be made without departing from the spirit of the invention, and all of such changes are contemplated as may come within the scope of the claims.

What is claimed as the invention is:

1. An electric motor comprising: a shaft-like core of magnetically permeable material having an intermediate toroidal portion of enlarged diameter; a casing of magnetically permeable material surrounding said core and non-rotatably fixed thereto by a flux-conducting connection therewith, said casing also having a toroidal inner surface portion conforming to the shape of the toroidal portion of the core and spaced therefrom to provide a toroidal air gap; a tubular low resistance rotor of non-magnetic and electrically conductive material mounted for rotation relative to said core and casing and coaxially surrounding said core within said casing, said rotor having opposite ends and also having an intermediate portion in the form of a toroidal shell disposed within and conforming to the shape of said air gap; permanent magnet means for causing magnetic flux flow in said casing, core and air gap; and a single thermocouple for causing flow of low voltage current from one end of said rotor through the portion thereof within said air gap to the other end of said rotor to thereby effect turning movement of said rotor, said rotor having a low resistance substantially equal to that of said thermocouple.

2. An electric motor comprising: a magnetically permeable core having intermediate and opposite end portions; a magnetically permeable casing surrounding said core and comprising spaced sections non-rotatably fixed thereto by flux-conducting connections with said opposite core end portions, portions of said casing sections being spaced from said intermediate core portions to provide air gaps therewith; a low resistance rotor mounted for rotation relative to said core and casing and having portions of non-magnetic and electrically conductive material movable in said air gaps; a driven member connected to said rotor in the space between said casing sections; permanent magnet means for causing magnetic flux flow through said core, said casing sections and said air gaps; and a single thermocouple for causing flow of low voltage electric current through the portions of said rotor within said air gaps to thereby effect turning movement of said rotor and actuation of the driven member, said rotor portions having a low resistance substantially equal to that of said thermocouple.

3. An electric motor comprising: a shaft-like core of magnetically permeable material having an intermediate toroidal portion of enlarged diameter; a casing of magnetically permeable material having tubular end portions surrounding the ends of said core, said casing also having a toroidal inner surface portion conforming to the shape of the toroidal portion of the core and spaced therefrom to provide a toroidal air gap, said casing being formed with an annular peripheral slot at the toroidal surface portion thereof separating said casing into two spaced sections; an annular permanent magnet disposed within the outer end of each casing section and surrounding the adjacent core end portion to afford a fixed flux-conducting connection with said core and casing end portions; a low resistance rotor of non-magnetic and electrically conductive material mounted for rotation relative to said core and casing and having a portion in the form of a toroidal shell disposed within and conforming to the shape of said air gap; a driven member connected to said rotor through said annular casing slot; said permanent magnets causing magnetic flux flow in said core, casing sections and air gap; and a single thermocouple for causing flow of low voltage electric current through the portion of said rotor within said air gap to thereby effect turning movement of said rotor and actuation of said driven member, said rotor having a low resistance substantially equal to that of said thermocouple.

4. An electric motor comprising: a shaft-like core of magnetically permeable material having an intermediate toroidal portion of enlarged diameter; a casing of magnetically permeable material having tubular end portions surrounding the ends of said core, said casing also having a toroidal inner surface portion conforming to the shape of the toroidal portion of the core and spaced therefrom to provide a toroidal air gap; an annular permanent magnet disposed within each casing end portion and surrounding the adjacent core end portion to afford a fixed flux-conducting connection with said core and casing end portions; a rotor of non-magnetic and electrically conductive material mounted for rotation relative to said core and casing and having a portion in the form of a toroidal shell disposed within and conforming to the shape of said air gap; said permanent magnets causing magnetic flux flow in said core, casing and air gap; and means for connecting said rotor to a source of direct current for causing flow of direct current through the portion of said rotor within said air gap to thereby effect turning movement of said rotor.

5. An electric motor comprising: a shaft-like permanent magnet core having an intermediate toroidal portion of enlarged diameter; a casing of magnetically permeable material having tubular end portions surrounding the ends of said core, said casing also having a toroidal inner surface portion conforming to the shape of the toroidal portion fo the core and spaced therefrom to provide a toroidal air gap; means affording a fixed flux-conducting connection between the adjacent core and casing end portions; a rotor of non-magnetic and electrically conductive material mounted for rotation relative to said core and casing and having a portion in the form of a toroidal shell disposed within and conforming to the shape of said air gap; the permanently magnetic character of said core causing magnetic flux flow in said casing and air gap; and means for connecting said rotor to a source of direct current for causing flow of direct current through the portion of said rotor within said air gap to thereby effect turning movement of said rotor.

6. An electric motor comprising: a shaft-like core of magnetically permeable material having an intermediate toroidal portion of enlarged diameter; a casing of magnetically permeable material having tubular end portions surrounding the ends of said core, said casing also having a toroidal inner surface portion conforming to the shape of the toroidal portion of the core and spaced therefrom to provide a toroidal air gap; an annular permanent magnet disposed within each casing end portion and surrounding the adjacent core end portion to afford a fixed flux conducting connection with said core and casing end portions; a rotor of non-magnetic and electrically conductive material mounted for rotation relative to said core and casing and having a portion in the form of a toroidal shell disposed within and conforming to the shape of said air gap; said permanent magnets causing magnetic flux flow in said core, casing and air gap; means for connecting said rotor to a source of direct current for causing flow of direct current through the portion of said rotor within said air gap to thereby effect turning movement of said rotor; a member to be driven; and means affording a driving connection between said rotor and said member to be driven.

7. An electric motor comprising: a shaft-like permanent magnet core having an intermediate toroidal portion of enlarged diameter; a casing of magnetically permeable material having tubular end portions surrounding the ends of said core, said casing also having a toroidal inner surface portion conforming to the shape of the toroidal portion of the core and spaced therefrom to provide a toroidal air gap; means affording a fixed flux conducting connection between the adjacent core and casing end portions; a rotor of non-magnetic and electrically conductive material mounted for rotation relative to said core and casing and having a portion in the form of a toroidal shell disposed within and conforming to the shape of said air gap; the permanently magnetic character of said core causing magnetic flux flow in said casing and air gap; means for connecting said rotor to a source of direct current for causing flow of direct current through the portion of said rotor within said air gap to thereby effect turning movement of said rotor; a member to be driven; and means affording a driving connection between said rotor and said member to be driven.

8. An electric motor comprising; a shaft-like core of magnetically permeable material having an intermediate toroidal portion of enlarged diameter; a casing of magnetically permeable material surrounding said core and non-rotatably fixed thereto by a flux conducting connection therewith, said casing also having a toroidal inner surface portion conforming to the shape of toroidal portion of the core and spaced therefrom to provide a toroidal air gap; a tubular low resistance rotor of non-magnetic and electrically conductive material mounted for rotation relative to said core and casing and coaxially surrounding said core within said casing, said rotor having opposite ends and also having an intermediate portion in the form of a toroidal shell disposed within and conforming to the shape of said air gap; permanent magnet means for causing magnetic flux flow in said casing, core and air gap; and means for causing flow of unidirectional current from one end of said rotor through the portion thereof within said air gap to the other end of said rotor to thereby effect turning movement of said rotor.

9. An electric motor comprising: a magnetically permeable core having intermediate and opposite end portions; a magnetically permeable casing surrounding said core and comprising spaced sections non-rotatably fixed thereto by flux conducting connections with said opposite core end portions, portions of said casing section being spaced from said intermediate core portions to provide air gaps therewith; a low resistance rotor mounted for rotation relative to said core and casing and having portions of non-magnetic and electrically conductive material movable in said air gaps; a driven member connected to said rotor in the space between said casing sections; permanent magnet means for causing magnetic flux flow through said core, said casing sections and said air gaps; and means for causing flow of unidirectional current through the portions of said rotor within said air gaps to thereby effect turning movement of said rotor and actuation of the driven member.

10. An electric motor comprising: a shaft-like core of magnetically permeable material having an intermediate toroidal portion of enlarged diameter; a casing of magnetically permeable material having tubular end portions surrounding the ends of said core, said casing also having a toroidal inner surface portion conforming to the shape of the toroidal portion of the core and spaced therefrom to provide a toroidal air gap, said casing being formed within an annular peripheral slot at the toroidal surface portion thereof separating said casing into two space sections; an annular permanent magnet disposed within the outer end of each casing section and surrounding the adjacent core end portion to afford a fixed flux-conducting connection with said core and casing end portions; a low resistance rotor of non-magnetic and electrically conductive material mounted for rotation relative to said core and casing and having a portion in the form of a toroidal shell disposed within and conforming to the shape of said air gap; a driven member connected to said rotor through said annular casing slot; said permanent magnet causing magnetic flux flow in said core, casing sections and air gap; and means for causing flow of unidirectional electric current through the portion of said rotor within said air gap to thereby effect turning movement of said rotor and actuation of said driven member.

References Cited in the file of this patent

UNITED STATES PATENTS

| | | |
|---|---|---|
| 288,817 | Kimball | Nov. 20, 1883 |
| 293,758 | Lubke | Feb. 19, 1884 |
| 341,097 | DeFerranti | May 4, 1886 |
| 375,255 | Blades | Dec. 20, 1887 |
| 1,199,444 | Varley | Sept. 26, 1916 |
| 1,236,309 | Johnson | Aug. 7, 1917 |
| 1,262,585 | Hollingshead | Apr. 9, 1918 |
| 1,564,877 | Marcellus | Dec. 8, 1925 |
| 1,838,146 | Klopsteg | Dec. 29, 1931 |
| 2,362,259 | Findley | Nov. 7, 1944 |
| 2,482,847 | Godman | Sept. 27, 1949 |
| 2,539,569 | Clark | Jan. 30, 1951 |

FOREIGN PATENTS

| | | |
|---|---|---|
| 59,409 | Germany | Oct. 17, 1891 |
| 701,855 | Germany | Jan. 24, 1941 |
| 894,422 | France | Mar. 13, 1944 |